(12) United States Patent
Doub et al.

(10) Patent No.: US 6,545,642 B1
(45) Date of Patent: Apr. 8, 2003

(54) ANTENNA/PUSH-BUTTON ASSEMBLY AND PORTABLE RADIOTELEPHONE INCLUDING THE SAME

(75) Inventors: Michael D. Doub, Chapel Hill, NC (US); Mark Gordon Douglas, Raleigh, NC (US); Gerard James Hayes, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/500,517

(22) Filed: Feb. 9, 2000

(51) Int. Cl.[7] .................................................. H01Q 1/24

(52) U.S. Cl. ................... 343/702; 343/700 MS

(58) Field of Search .......................... 343/702, 700 MS, 343/846; 455/90

(56) References Cited

U.S. PATENT DOCUMENTS

| | | | |
|---|---|---|---|
| 5,235,633 A | 8/1993 | Dennison et al. | 379/60 |
| 5,625,668 A | 4/1997 | Loomis et al. | 379/58 |
| 5,838,280 A | 11/1998 | Miyashita | 343/700 MS |
| 5,870,279 A | * 2/1999 | Mahany et al. | 361/679 |

* cited by examiner

Primary Examiner—Hoang Nguyen
(74) Attorney, Agent, or Firm—Myers Bigel Sibley & Sajovec

(57) ABSTRACT

An antenna/push-button assembly includes a first contact, a second contact movable relative to said first contact, and a button member including an integral antenna. The button member is movable to engage the second contact with the first contact. The antenna may be a patch antenna. A portable telecommunications device includes an antenna/push-button assembly comprising a button member. The button member includes an integral antenna. The button member is operable to control a function of the device.

21 Claims, 6 Drawing Sheets

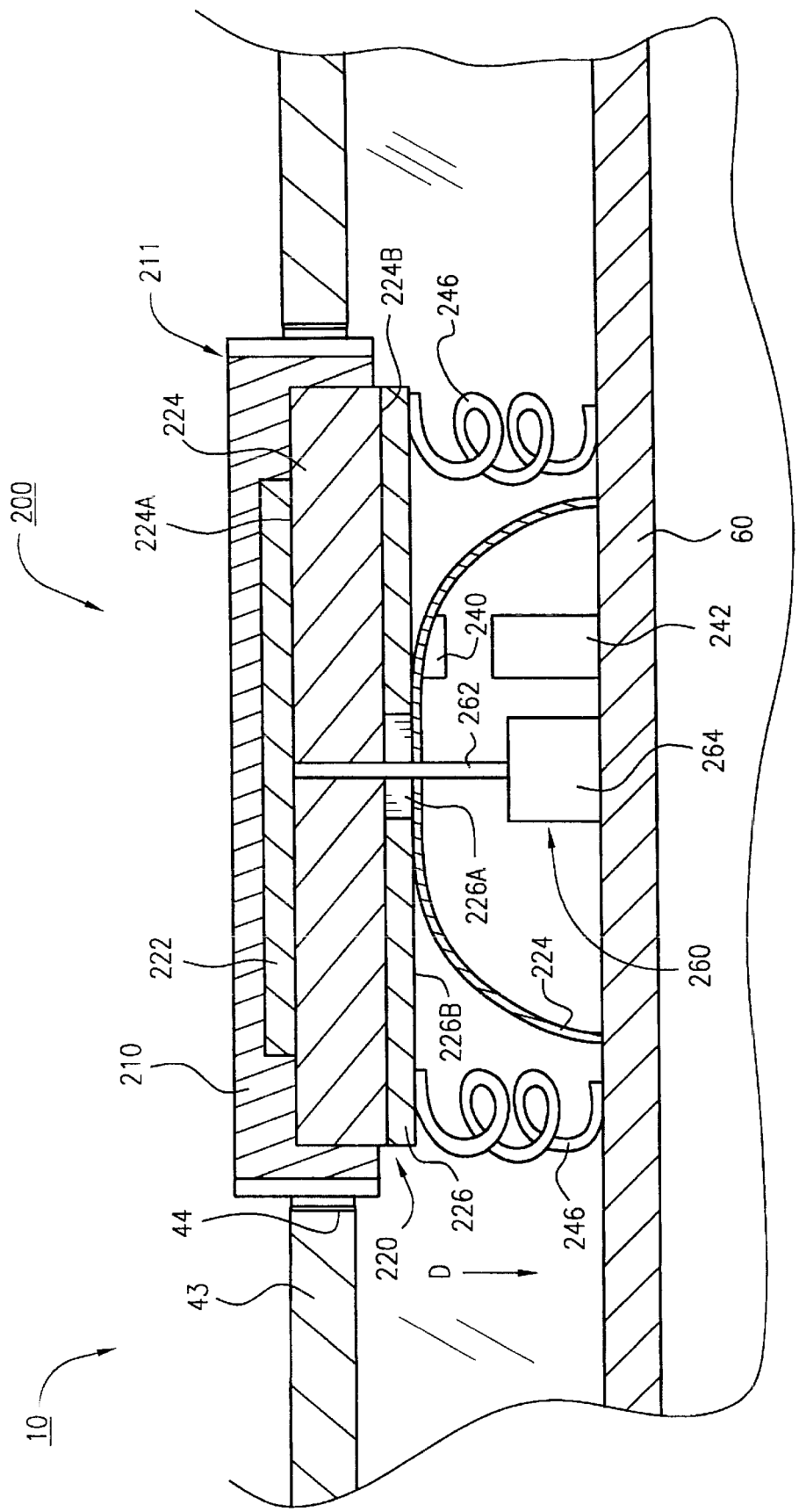

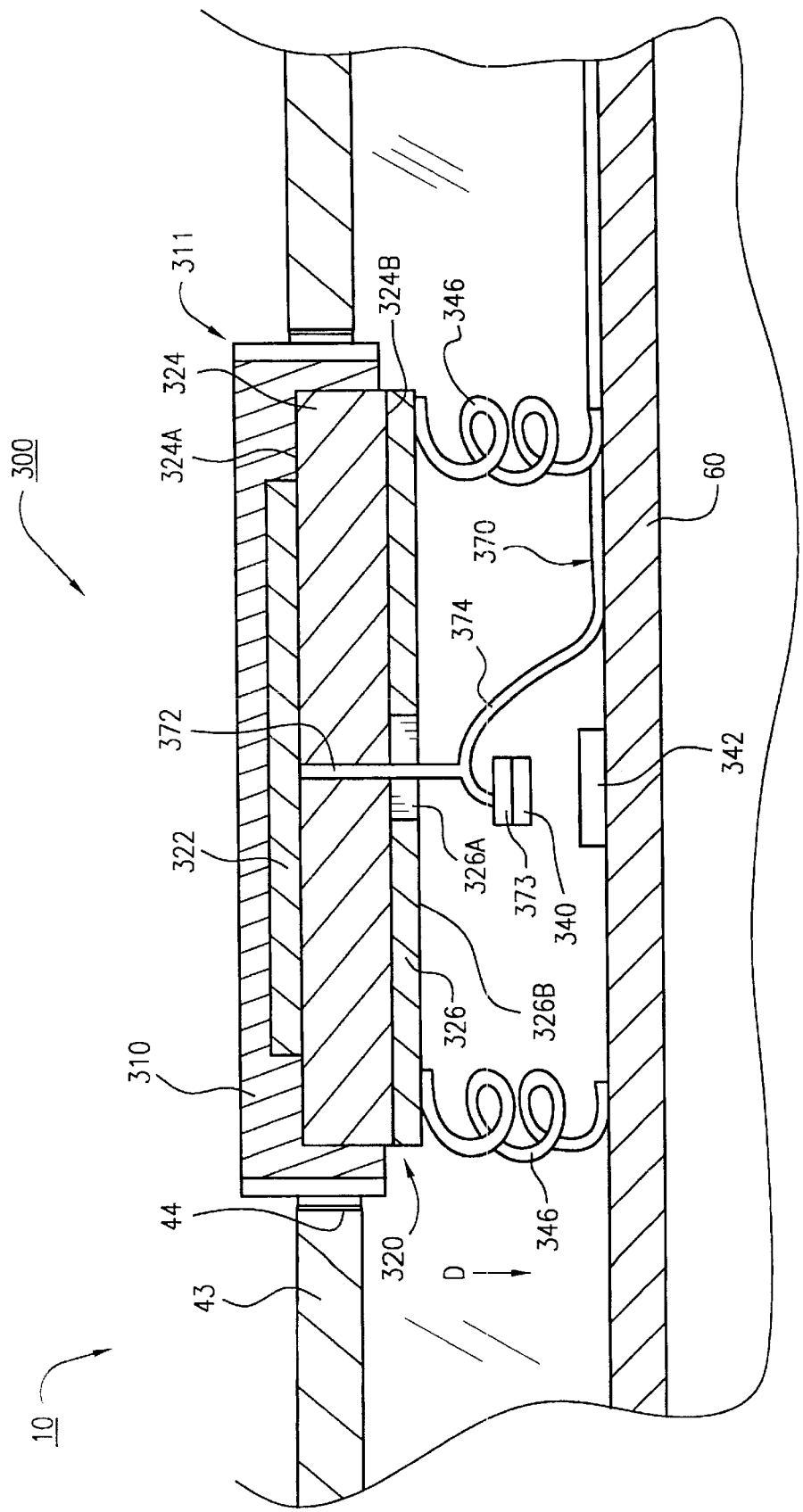

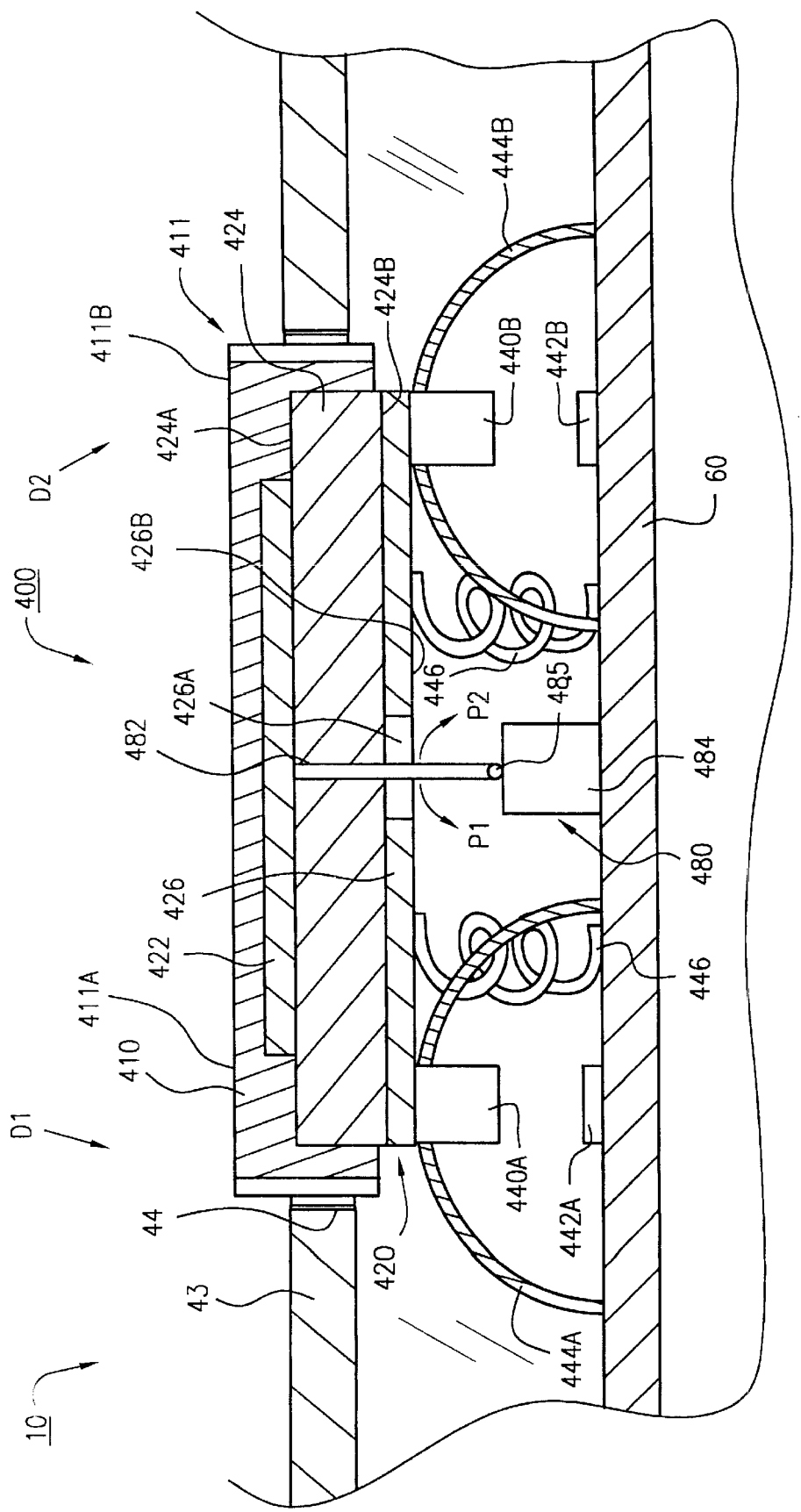

ANTENNA/PUSH-BUTTON ASSEMBLY AND PORTABLE RADIOTELEPHONE INCLUDING THE SAME

FIELD OF THE INVENTION

The present invention relates to the field of communications and more particularly to telecommunications devices including antennas.

BACKGROUND OF THE INVENTION

Personal telecommunications devices such as satellite radiotelephones, combined satellite and cellular radiotelephones, global positioning systems (GPS) and the like often employ one or more patch antennas for receiving and/or sending radio signals. For example, it has been proposed to provide global positioning features in cellular radiotelephones. See, e.g., U.S. Pat. No. 5,235,633 to Dennison et al. and U.S. Pat. No. 5,625,668 to Loomis et al., the disclosures of which are hereby incorporated herein in their entireties by reference.

Portable radiotelephones including GPS receivers have typically used an additional antenna to provide GPS reception. For example, quadrifilar helix antennas extending from the radiotelephone body have been used. Quadrifilar helix antennas may be difficult to integrate into an industrial design.

In co-assigned and co-pending application Ser. No. 09/193,587, filed Nov. 17, 1998, the disclosure of which is hereby incorporated herein in its entirety, there are disclosed radiotelephones including GPS receivers which incorporate patch antennas to receive global positioning system signals. Locating the patch antenna in/on the radiotelephone body in a manner which does not significantly affect the dimensions thereof is discussed. However, in order to do so, the patch antenna is perforated so as not to interfere with other functions or components of the radiotelephone such as speakers and buttons. Such perforations may necessitate special tuning of the antenna and/or reduce the performance of the antenna.

It is often difficult or impractical to find space for a patch antenna on the increasingly small handsets of radiotelephones and GPS devices. Often, the overall size or range of functionality of the device must be designed to accommodate the patch antenna(s). In some cases, the provision of a patch antenna may simply be impractical.

SUMMARY OF THE INVENTION

The present invention is directed to an antenna/push-button assembly which reduces or eliminates the problems associated with antennas such as patch antennas in small telecommunications devices as discussed above. The antenna/push-button assembly makes improved use of the available space of the device by integrating the antenna and one or more push-button functions.

According to an aspect of the present invention, an antenna/push-button assembly includes a first contact, a second contact movable relative to the first contact, and a button member. The button member includes an integral antenna. The button member is movable to engage the second contact with the first contact. The antenna may be a patch antenna.

Preferably, the assembly includes a spring member operative to bias the second contact away from the first contact. The button member may include a button cover covering at least a portion of the antenna. Preferably, the antenna is a patch antenna including a dielectric substrate having upper and lower opposed surfaces, an electrically conductive patch element disposed on the upper surface, and a ground plane layer disposed on the lower surface. The assembly may include a flexible grounding connector having a first end connected to the ground plane layer and a second end adapted to be connected to a supplemental ground plane spaced from the ground plane layer. An antenna feed line may extend through the ground plane layer and the dielectric substrate, the feed line being electrically coupled to the patch element.

According to a further aspect of the present invention, a portable telecommunications device includes an antenna/push-button assembly comprising a button member. The button member includes an integral antenna. The button member is operable to control a function of the telecommunications. The antenna may be a patch antenna.

According to a further aspect of the present invention, a portable telecommunications device includes a circuit board and an antenna/push-button assembly. The antenna/push-button assembly includes a first contact mounted on the circuit board, a second contact movable relative to the first contact, and a button member. The button member includes an integral antenna. The button member is movable to engage the second contact with the first contact. The antenna may be a patch antenna.

The portable telecommunications device may include: a transceiver that transmits and receives radiotelephone communications; a processor coupled to the transceiver that processes the radiotelephone communications transmitted and received by the transceiver; a speaker coupled to the processor that generates sound responsive to the received radiotelephone communications; and a microphone coupled to the processor that generates electrical signals for the transmitted radiotelephone communications responsive to outside sound. The antenna includes a conductive layer that receives electromagnetic signals. The antenna is coupled to the processor and/or the transceiver. The antenna may be a patch antenna.

The telecommunications device may include a housing body, wherein the circuit board is disposed in the housing body. The button member is movably received in the housing body.

The objects of the present invention will be appreciated by those of ordinary skill in the art from a reading of the figures and the detailed description of the preferred embodiment which follow, such description being merely illustrative of the present invention.

BRIEF DESCRIPTION OF THE DRAWINGS

FIG. 5 is an enlarged, partial, cross-sectional view of an alternative antenna/push button assembly according to the present invention mounted in the radiotelephone and taken along a line corresponding to the line 4—4 of FIG. 1;

FIG. 6 is an enlarged, partial, cross-sectional view of a further alternative antenna/push button assembly according to the present invention mounted in the radiotelephone and taken along a line corresponding to the line 4—4 of FIG. 1; and FIG. 7 is an enlarged, partial, cross-sectional view of a further alternative antenna/push button assembly according to the present invention mounted in the radiotelephone and taken along a line corresponding to the line 4—4 of FIG. 1.

DETAILED DESCRIPTION OF THE INVENTION

Figure 1:
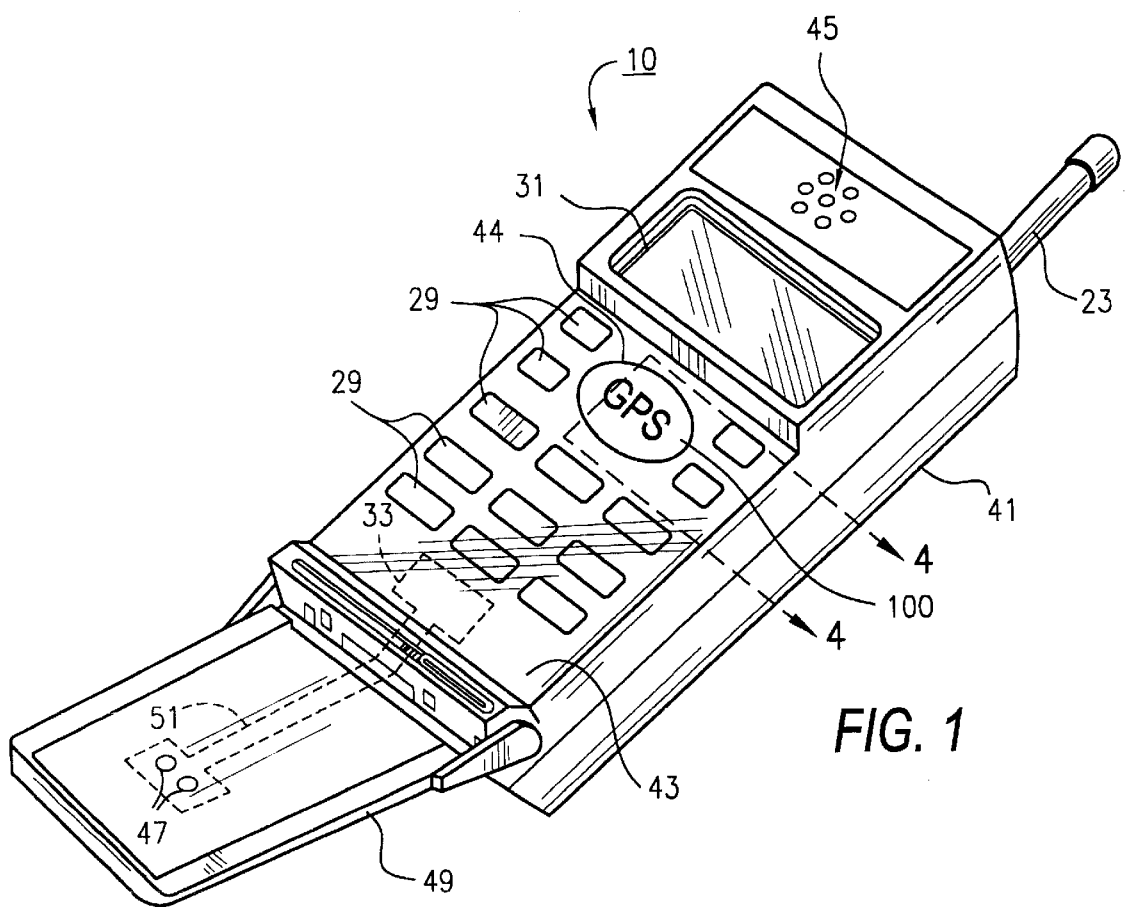
FIG. 1 is a perspective view of a radiotelephone including an antenna/push-button assembly according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thicknesses of layers and regions of the cross sections are exaggerated for clarity. Like numbers refer to like elements throughout. It will also be understood that when a layer is referred to as being "on" another layer or substrate, it can be directly on the other layer or substrate, or intervening layers may also be present. In contrast, when an element is referred to as being "directly on" another element, there are no intervening elements present.

An antenna/push-button assembly according to the present invention may be incorporated into any suitable device which requires or makes advantageous use of both an antenna and a push-button. It is particularly contemplated that the antenna/push-button assembly may include a patch antenna and be employed in a radiotelephone having GPS, for example as described hereinbelow. However, it will be appreciated by those of skill in the art upon reading the description herein that the antenna/push-button assembly may be used in numerous other devices. Such devices include, but are not limited to, GPS-only devices, radiotelephones including both cellular and satellite processing capabilities, radiotelephones including only cellular capabilities, and wireless network devices.

Figure 2:
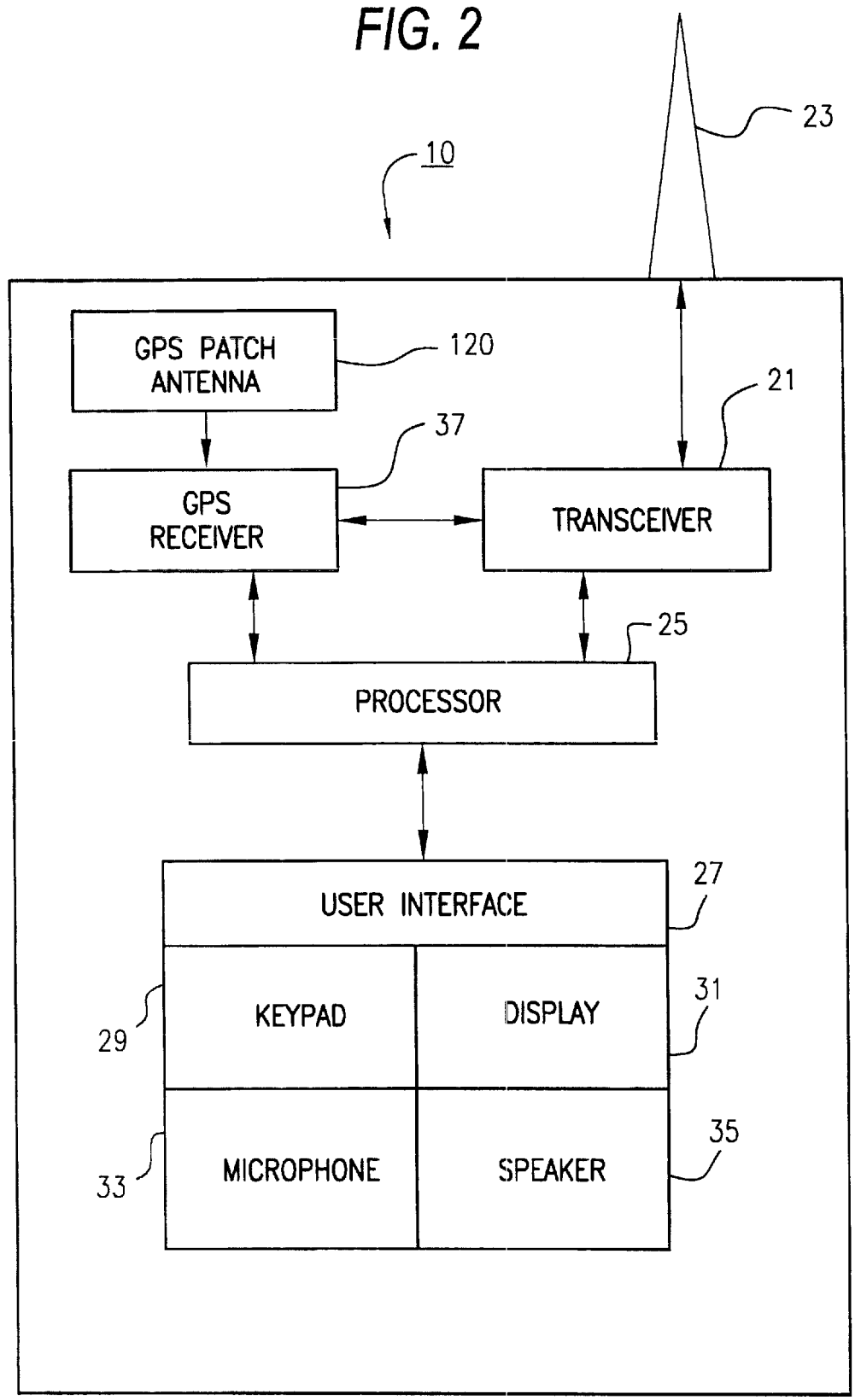
FIG. 2 is a block diagram of the radiotelephone of FIG. 1.

A cellular radiotelephone 10 including an antenna/push-button assembly 100 according to the present invention is illustrated in FIGS. 1–4. As shown in FIG. 2, the cellular radiotelephone 10 includes a transceiver 21 for transmitting and receiving cellular radiotelephone communications through an antenna 23, and a processor 25 for processing the communications transmitted and received by the transceiver 21. In addition, a user interface 27 is coupled with the processor 25, and the user interface can include the antenna/push-button assembly 100 (see FIG. 1), a keypad 29, a display 31, a microphone 33, and a speaker 35. Accordingly, the radiotelephone 10 can accept user speech through the microphone 33 for transmission to a radiotelephone communications system, and reproduce speech received from a distant party over the radiotelephone communications system using the speaker 35. Radiotelephone information can be provided to the user through the display 31, and user input can be accepted through the keypad 29 and the antenna/push-button assembly 100.

In addition, the radiotelephone 10 includes a GPS receiver 37 and a GPS patch antenna 120. The GPS receiver 37 can thus accurately determine the geographic position of the radiotelephone 10, and provide the geographic information to the radiotelephone processor 25. Accordingly, this geographic information can be provided to the radiotelephone user either visually through the display 31 or audibly through the speaker 35. The geographic information can also be transmitted through the transceiver 21 and the antenna 23 to the radiotelephone communications system. For example, the geographic information can be transmitted during a "911" call to assist an emergency response by police, fire, and/or rescue personnel. The geographic information can also be used, for example, to make call management decisions as discussed in U.S. Pat. No. 5,235,633, spoken with a speech synthesizer as discussed in U.S. Pat. No. 5,625,668, or otherwise communicated to the user of the radiotelephone.

As will be understood by those having skill in the art, the GPS receiver 37, the transceiver 21, and the processor 25 can be provided separately as shown in FIG. 2. Alternately, two or more of these elements can be provided together. For example, the processor can be defined as including one or both of the GPS receiver and the transceiver, and/or the transceiver can be defined as including the GPS receiver. These elements are shown separately for the sake of clarity of this disclosure and not for purposes of limitation. Moreover, these elements can be provided individually or in combination, and can be provided as one or more custom and/or standard integrated circuit devices and/or discrete devices running firmware and/or software.

As shown in FIG. 1, the radiotelephone includes a body 41 housing the antenna/push-button assembly 100, the display 31, the keypad 29, the microphone 33, and the antenna 23 as shown. The housing also encloses the GPS receiver 37, the transceiver 21, a printed circuit board (PCB) 60 (see FIG. 4), the processor 25, and the speaker 35 which are not visible in the perspective view of FIG. 1.

The radiotelephone body 41 includes a front face 43 which is held to the user's head when talking. Accordingly, the speaker 35 is mounted adjacent the front face 43, and holes 45 are provided in the front face 43 adjacent the speaker 35 to allow sound from the speaker to pass therethrough. A moveable flip portion 49 extends the front face 43 when opened as shown, and the microphone 33 is included in the main portion of the radiotelephone body 41. A channel 51 through the flip portion 49 conducts sound from the holes 47 to the microphone 33. When closed, the flip portion 49 covers a portion of the radiotelephone body. The front face of the radiotelephone body also includes the display 31 and the keypad 29. The flip portion 49 covers the keypad 29 when closed. The flip portion 49 may be extended (not shown) to cover the display 31 when closed as well.

Figure 3:
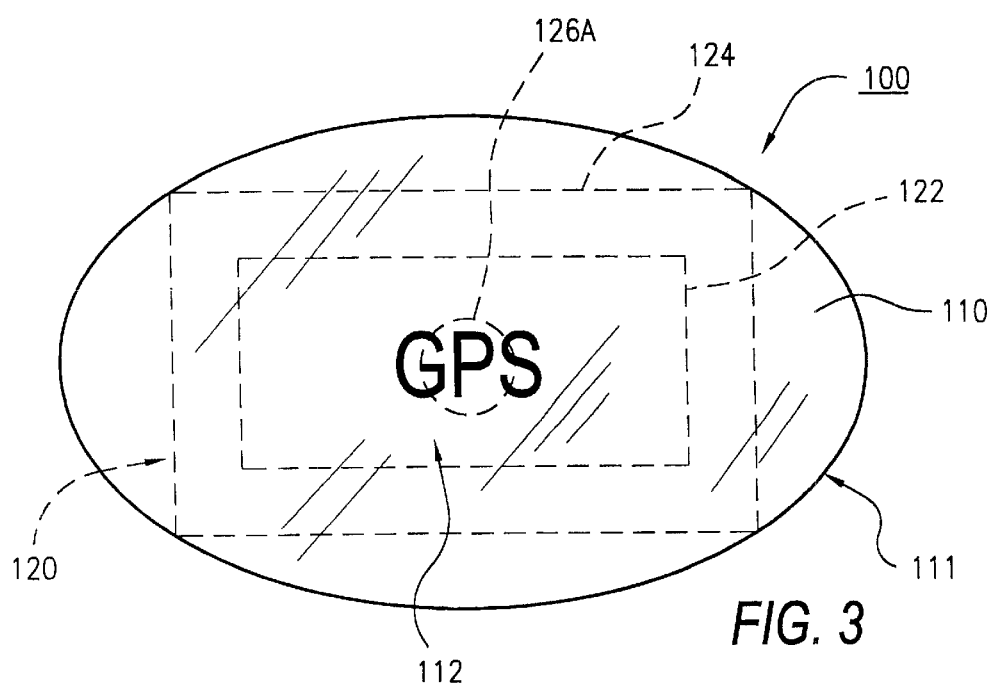
FIG. 3 is an enlarged, partial top plan view of the antenna/push-button assembly of the radiotelephone of FIG. 1.
Figure 4:
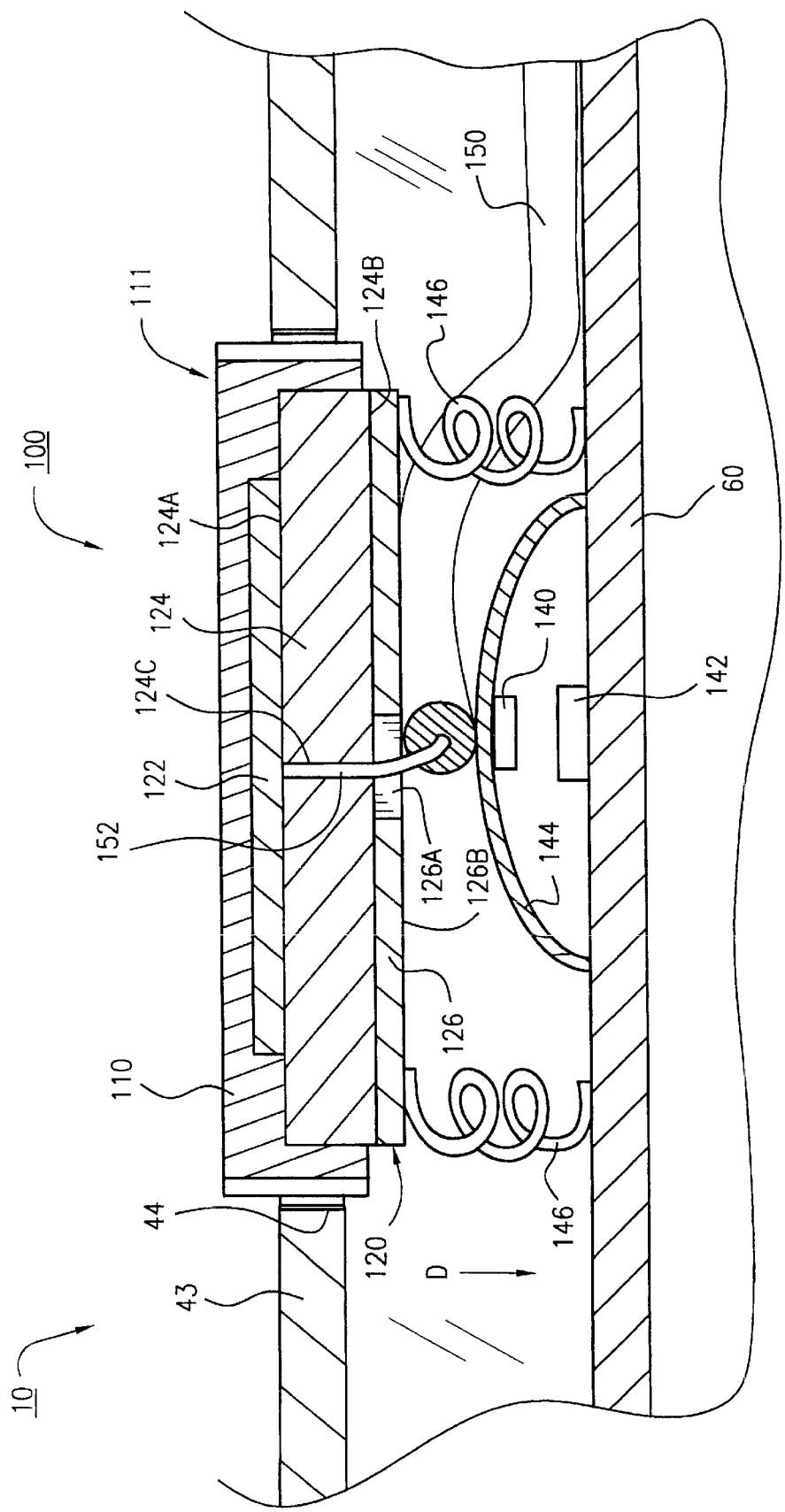
FIG. 4 is an enlarged, partial, cross-sectional view of the radiotelephone of FIG. 1 taken along the line 4—4 of FIG. 1.

With reference to FIGS. 3 and 4, the antenna/push-button assembly 100 is mounted in a hole 44 in the front face 43. The antenna/push-button assembly 100 includes a button member 111. The button member includes a button cover 110 and a patch antenna 120.

The patch antenna 120 includes a dielectric substrate 124 having an upper surface 124A and a lower surface 124B. A conductive antenna patch element 122 is secured to the upper surface 124A of the dielectric substrate 124. A ground plane layer 126 is secured to the lower surface 124B of the dielectric substrate 124. The ground plane layer 126 has a hole 126A formed therein and a lower surface 126B. The area of the ground plane layer 126 is substantially the same as that of the dielectric substrate 124 with the exception of the hole 126A. Alternatively (not shown), the ground plane layer may be substantially larger than the dielectric substrate. The dielectric substrate 124 is preferably formed of loaded ceramic or air. The conductive patch element 122 is preferably formed of copper. The ground plane layer 126 is preferably formed of copper.

The button cover 110 is secured to the patch antenna 120 such that the entirety of the patch antenna 120 extending above the housing 43 is enveloped in and protected by the button cover 110. Preferably, the button cover 110 is formed from a plastic or other material which does not significantly attenuate the GPS signals (typically 1575.42 MHz) received by the patch antenna 120. Indicia 112 may be provided on the button cover 110 to indicate to the user the button's function.

The conductive patch element 122 is fed by a flexible coaxial cable 150. More particularly, the center conductor 152 of the coaxial cable 150 extends through the hole 126A and the dielectric substrate 124 and is electrically connected to the patch element 122. The center conductor 152 thereby serves as the feed line. The size and shape of the element 122 tunes the antenna 120. The placement of the connection between the feed line 152 and the element 122 determines impedance matching and antenna polarization.

The performance of the patch antenna 120 is sensitive to the size and shape of the ground plane. In general, the antenna gain is improved when a larger ground plane is used. The ground plane layer 126 is connected to the larger ground plane of the PCB 60 by coil springs 146. Each of the springs 146 is electrically connected and secured, for example by soldering, to the lower surface 126B. The electrical reactance of the springs 146 should not be significant for the chosen frequency. By electrically connecting the ground plane layer 126 and the PCB ground plane 60, the springs 146 allow the patch antenna 120 to make use of the larger ground plane of the PCB 60. The springs 146 also ensure that the patch antenna ground plane layer 126 and the PCB ground plane are at the same electrical potential to prevent creation of undesirable radiating modes. The springs 146 provide connections to the PCB ground plane 60 without unduly hindering the button action of the patch antenna/push-button assembly 100, as discussed below. Alternatively, the springs 146 may bias or assist in biasing the button 111 away from the PCB 60. The springs 146 may be replaced by other suitable devices which provide the requisite electrical connection while allowing the push-button movement.

The construction and operability of the patch antenna 120 will be apparent to those of skill in the art upon reading the foregoing. Additionally, the antenna/push-button assembly 100 serves as a push-button of the radiotelephone 10 to allow user input and control. For example, the button member 111 may be depressed by the user to generate a signal (e.g., to turn on the device power or initiate a GPS request).

The coaxial cable 150 is secured by suitable means such as conductive adhesive or solder to the lower surface 126B of the patch antenna 120. A resilient membrane spring 144 is mounted on the PCB 60 and secured to the coaxial cable 150. A button contact 140 is secured to the membrane spring 144 and a contact pad 142 is mounted on the PCB 60. The button contact 140 and/or the contact pad 142 are electrically connected to an electrical circuit of the radiotelephone 10 such that their engagement and disengagement actuates the chosen function. For example, the engagement of the contact 140 and the contact pad 142 may operate to turn the phone on and off or to activate connection with a network. Suitable arrangements and components for such control buttons or switches are well-known in the art.

The membrane spring 144 biases the button member 111 upwardly away from the PCB 60 into the extended, ready position as shown in FIG. 4. When the user pushes the button member 111 in the direction D, the membrane spring 144 is compressed and the contact 140 engages the contact pad 142. Upon release of the button member 111, the membrane spring 144 applies an upward force so that the assembly 100 resumes the extended position and contact between the contact 140 and the contact pad 142 ceases. In this manner, the user may selectively engage the contacts 140, 142 with one another and thereby selectively actuate the associated function of the radiotelephone 10.

The antenna/push-button assembly 100 provides a number of advantages. Neither the performance of the antenna nor the performance of the push button is compromised. Space on the radiotelephone 10 and, in particular, premium space on the front panel of the radiotelephone, is conserved. The patch antenna 120 can be provided without significantly affecting the dimensions of the radiotelephone. The overall cost of providing the patch antenna function and the push-button function may be reduced. A sufficient ground plane is provided for the antenna. The feed to the patch antenna 120 does not hinder operation of the push-button function.

Preferably, the function of the radiotelephone 10 actuated by compressing the button member 111 is selected such that the patch antenna 120 is not needed while the button member 111 is being compressed. For example, the push-button action of the assembly 100 may initiate a GPS function such that the button member 111 need only be momentarily compressed and released (whereupon the user will typically remove his/her finger). This configuration can prevent the presence of a user's finger on the assembly 100 when compressing the button member 111 from degrading antenna performance.

Notably, the patch antenna 120 discussed above is oriented substantially parallel to the front face 43 of the radiotelephone body 41. Accordingly, the radiotelephone 10 is preferably held with the front face 43 substantially parallel to the ground and facing upward when receiving GPS signals from GPS satellites. This orientation gives the patch antenna a good, unobstructed view of the GPS satellite.

With reference to FIG. 5, an antenna/push-button assembly 200 according to a second embodiment is shown therein. The assembly 200 is mounted in the radiotelephone 10 in place of the antenna/push-button assembly 100 and the view of FIG. 5 is a cross-sectional view corresponding to that of FIG. 4. The assembly 200 includes elements 210, 211, 220, 222, 224, 224A, 224B, 226, 226A, 226B, 240, 242, 244 and 246 corresponding to elements 110, 111, 120, 122, 124, 124A, 124B, 126, 126A, 126B, 140, 142, 144 and 146 of the assembly 100.

The antenna/pushbutton assembly 200 differs from the assembly 100 in that the patch antenna 220 is fed by a collapsible "pogo" pin connector 260. The connector 260 has a base 264 electrically connected to an antenna feed connection on the PCB 60, and a pin 262 extending through the hole 226A and the substrate 224 and electrically connected to the base 264 and the conductive antenna patch element 222. The pin 262 is joined to the base 264 such that the pin 262 may be compressed into the base 264. Suitable connectors 260 include product no. RMP-122 available from the ECT Contact Division of Everett Charles Technologies of Pomona, Calif.

It will be appreciated by those of skill in the art that the assembly 200 will function in the same manner as the assembly 100, the membrane 244 being compressible in the direction D to allow contact between the button contact 240 and the contact pad 242 and biasing the button contact 240 away from the contact pad 242. The provision of the pogo pin connector 260 may allow the assembly 200 to be manufactured with greater ease and less cost than the assembly 100.

With reference to FIG. 6, an antenna/push-button assembly 300 according to a third embodiment is shown therein. The assembly 300 is mounted in the radiotelephone 10 in place of the antenna/push-button assembly 100 and the view of FIG. 6 is a cross-sectional view corresponding to that of FIG. 4. The assembly 300 includes elements 310, 311, 320, 322, 324, 324A, 324B, 326, 326A, 326B, 340, 342 and 346 corresponding to elements 110, 111, 120, 122, 124, 124A, 124B, 126, 126A, 126B, 140, 142 and 146 of the assembly 100.

The antenna/push-button assembly 300 differs from the assembly 100 in that the patch antenna 320 is fed by a conductive spring finger connector 370 and no membrane spring is provided. The connector 370 has a resilient spring portion 374 which biases the button member 311 into the extended position of FIG. 6. A lead 372 extends through the hole 326A and the dielectric substrate 324 and electrically connects the connector 370 to the patch element 322, thereby connecting the patch element 322 to an antenna feed connection on the PCB 60. The button contact 340 is mounted on the portion 372. A non-conductive spacer 373 is interposed between the contact 340 and the portion 372 to prevent the antenna from short circuiting when the button member 311 is pressed.

It will be appreciated by those of skill in the art that the assembly 300 will function in the same manner as the assembly 100, the spring finger portion 374 being compressible in the direction D to allow contact between the button contact 340 and the contact pad 342 and biasing the contact 340 away from the contact pad 342. The provision of the spring finger connector 370 allows the assembly 300 to be manufactured conveniently and inexpensively.

With reference to FIG. 7, an antenna/push-button assembly 400 according to a fourth embodiment is shown therein. The assembly 400 is mounted in the radiotelephone 10 in place of the antenna/push-button assembly 100 and the view of FIG. 7 is a cross-sectional view corresponding to that of FIG. 4. The assembly 400 includes elements 410, 411, 420, 422, 424, 424A, 424B, 426, 426A, 426B and 446 corresponding to elements 110, 111, 120, 122, 124, 124A, 124B, 126, 126A, 126B and 146 of the assembly 100.

The assembly 400 is a two position "rocker" button. The button member 411 may be pressed on one side 411A in the direction D1 to actuate one function and may be pressed on the other side 411B in the direction D2 to actuate another function, for example.

The antenna patch element 422 is electrically connected to a feed on the PCB 60 by a non-collapsible hinge connector 480 having a base 484 (which is electrically connected to the antenna feed) and a pin 482 which serves as the antenna feed line. The pin 482 is hingedly connected to the base 484 by a pivot pin 485. The pivot pin 485 allows the button member 411 to pivot about the base 484 in directions P1 and P2.

A first membrane spring 444A biases a first button contact 440A away from an associated contact pad 442A on the PCB 60. A second membrane spring 444B biases a second button contact 440B away from an associated contact pad 442B.

In use, the user may press on the first side 411A of the button member 411 to cause the button member 411 to pivot about the pivot pin 485 and compress the membrane 444A so that the button contact 440A engages the contact pad 442A. Alternatively, the user may press on the side 411B of the button member 411 to engage the button contact 440B with the contact pad 442B.

While the button contacts 140, 240, 340, 440A, 440B as described above are mounted at preferred locations, the button contacts may alternatively be mounted at other locations on the button members 111, 211, 311, 411. For example, the button contacts may be secured to the lower surfaces 126B, 226B, 326B, 426B of the ground layers 126, 226, 326, 426. In this case, electrically insulative spacers are preferably provided between the ground layers and the button contacts. Additionally, rather than being mounted on the button members 111, 211, 311, 411, the button contacts 140, 240, 340, 440A, 440B may be mounted on other components or additional linkages (not shown). For example, the button contacts may be mounted free of the button members except that displacement of the associated button member causes, by direct abutment or via a linkage, displacement of the button contact 140, 240, 340, 440A, 440B toward the base contact 142, 242, 343, 442A, 442B. More particularly, the button contacts may be secured to the membrane springs with neither the button contacts nor the membrane springs being secured to the associated button members.

In the patch antenna/push-button assemblies described above, the feed lines are directly connected to the patch elements. Alternatively, the feed lines may be spaced from but electromagnetically coupled to the patch elements.

The membrane springs 144, 244, 444A, 444B may be omitted by suitably designing the springs 146, 246, 446 to provide the desired biasing of the respective buttons 111, 211, 411.

While radiotelephones including patch antennas according to the present invention have been discussed with reference to cellular radiotelephones, the patch antennas of the present invention can be used with other radiotelephones such as satellite radiotelephones or dual mode radiotelephones capable of communicating with terrestrial and satellite communications systems, as well as radiotelephones capable of communicating with other types of terrestrial communications systems.

It is further contemplated that antennas of other types may be incorporated into an antenna/push-button assembly according to the invention in place of a patch antenna with suitable modification. For example, a wire antenna, a monopole antenna, a loop antenna, a dielectric resonator antenna (DRA), a planar inverted F antenna (PIFA), or a quadrifilar helix antenna may be used. The antenna/push-button assemblies are particularly advantageous when incorporating patch antennas because patch antennas allow for a desirably low profile. While the radiotelephone 10 has the additional antenna 23 for receiving and transmitting cellular radiotelephone communications, it is contemplated that an antenna serving this function may be incorporated into an antenna/push-button assembly according to the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, That which is claimed is:

1. An antenna/push-button assembly comprising:
   a) a first contact;
   b) a second contact movable relative to said first contact;
   c) a button member including an integral antenna; and
   d) a spring member operative to bias said second contact away from said first contact, wherein said spring member includes a membrane spring;
   d) wherein said button member is movable to engage said second contact with said first contact.

2. The assembly of claim 1 wherein said second contact is mounted on said button member.

3. The assembly of claim 1 wherein said button member includes a button cover covering at least a portion of said antenna.

4. The assembly of claim 1 wherein said antenna is a patch antenna.

5. The assembly of claim 4 wherein said patch antenna comprises a dielectric substrate having upper and lower opposed surfaces, an electrically conductive patch element disposed on said upper surface, and a ground plane layer disposed on said lower surface.

6. An antenna/push-button assembly comprising:
   a) a first contact;
   b) a second contact movable relative to said first contact; and
   c) a button member including an integral antenna;
   d) wherein said button member is movable to engage said second contact with said first contact; and
   e) wherein said button member includes a button cover covering at least a portion of said antenna.

7. The assembly of claim 6 wherein said second contact is mounted on said button member.

8. The assembly of claim 6 including a spring member operative to bias said second contact away from said first contact.

9. The assembly of claim 6 wherein said antenna is a patch antenna.

10. The assembly of claim 9 wherein said patch antenna comprises a dielectric substrate having upper and lower opposed surfaces, an electrically conductive patch element disposed on said upper surface, and a ground plane layer disposed on said lower surface.

11. An antenna/push-button assembly comprising:
    a) a first contact;
    b) a second contact movable relative to said first contact; and
    c) a button member including an integral antenna;
    d) wherein said button member is movable to engage said second contact with said first contact; and
    e) wherein said antenna is a patch antenna comprising a dielectric substrate having upper and lower opposed surfaces, an electrically conductive patch element disposed on said upper surface, and a ground plane layer disposed on said lower surface.

12. The assembly of claim 11 including a flexible grounding connector having a first end connected to said ground plane layer and a second end adapted to be connected to a supplemental ground plane spaced from said ground plane layer.

13. The assembly of claim 12 wherein said grounding connector includes a resilient coil spring.

14. The assembly of claim 11 including an antenna feed line extending through said ground plane layer and said dielectric substrate and electrically coupled to said patch element.

15. The assembly of claim 14 including a coaxial cable and wherein said antenna feed line includes a center conductor of said coaxial cable.

16. The assembly of claim 14 including a pogo pin connector having a base and wherein said antenna feed line includes a pin of said pogo pin connector, said pin being displaceable with respect to said base.

17. The assembly of claim 14 including an electrically conductive resilient spring finger, wherein said antenna feed line is connected to said spring finger and said second contact is mounted on said spring finger.

18. The assembly of claim 14 including a pivot pin connector having a base and a pin which is pivotable about said base, wherein said antenna feed line includes said pin of said pivot pin connector.

19. The assembly of claim 18 including a third contact and a fourth contact, wherein said button member is pivotable about said base to selectively engage said first contact with said second contact and said third contact with said fourth contact.

20. The assembly of claim 11 wherein said second contact is mounted on said button member.

21. The assembly of claim 11 including a spring member operative to bias said second contact away from said first contact.

* * * * *